P. A. CUSTER.
DIFFERENTIAL.
APPLICATION FILED OCT. 4, 1920.

1,406,446.

Patented Feb. 14, 1922.
2 SHEETS—SHEET 1.

Inventor
P. A. Custer
By
Attorney

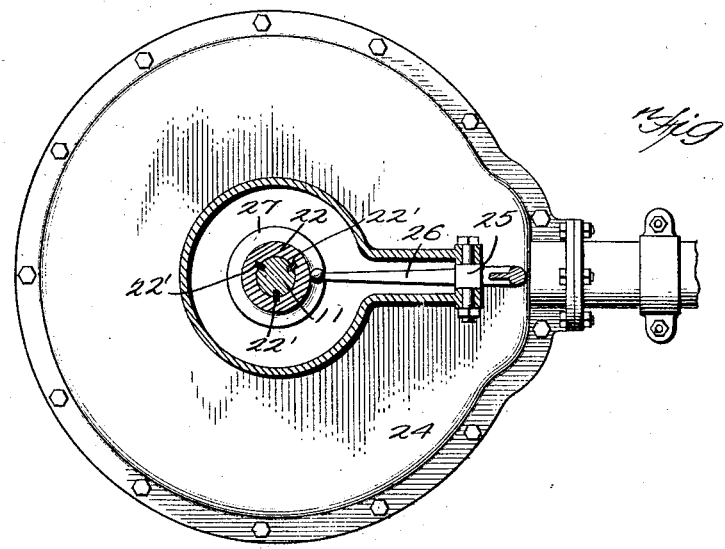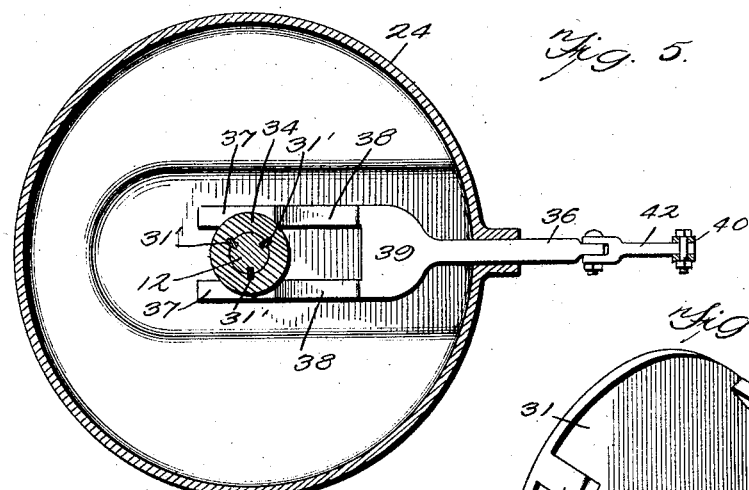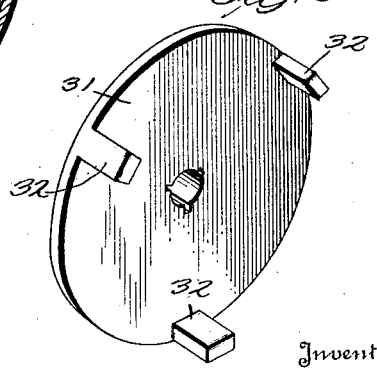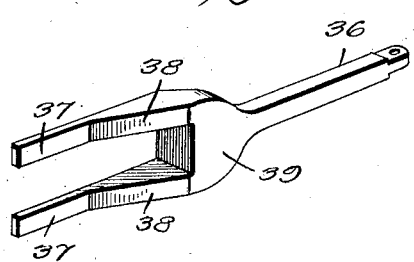

UNITED STATES PATENT OFFICE.

PETER A. CUSTER, OF JACKSONVILLE, FLORIDA.

DIFFERENTIAL.

1,406,446.  Specification of Letters Patent.  Patented Feb. 14, 1922.

Application filed October 4, 1920. Serial No. 414,538.

*To all whom it may concern:*

Be it known that I, PETER A. CUSTER, a citizen of the United States, residing at Jacksonville, in the county of Duval and State of Florida, have invented certain new and useful Improvements in Differentials, of which the following is a specification.

This invention relates to improvements in differentials.

An important object of the invention is to provide a differential particularly adapted for use with tractors.

A further object of the invention is to provide a differential having means whereby either the idler gear, or the ring gear, of the differential may be locked positively to the shaft upon which it is mounted, whereby the shafts bearing the driving wheels are caused to rotate in opposite directions, and in positive connection in the same direction respectively. With the present differential, if one wheel of the automobile or tractor becomes locked in any manner, as for example by coming to rest in a deep depression, the other wheel will spin and it becomes necessary to jack the car up and block up the wheel which has fallen into the depression until the locking of the wheel is eliminated. It will be seen that if a positive drive in such a case could be afforded to both wheels, that the automobile could be shifted without the necessity of blocking it up. Furthermore, when turning, due to the fact that both wheels drive in the same direction, if the guiding wheels are cut at a sharp angle, one wheel of the drive has a tendency to lock with the same result. I have eliminated this trouble by providing means whereby the driving wheels may be rotated in opposite directions positively by the drive, thereby allowing short turning of the automobile without danger of locking one of the drive wheels.

Other objects and advantages of the invention will become apparent throughout the course of the following description.

In the accompanying drawings wherein for the purpose of illustration is shown a preferred embodiment of my invention, and wherein like numerals designate like parts throughout, Figure 1 is a sectional view taken through the differential embodying my invention.

Figure 4 is a section taken on the line 4—4 of Figure 1.

Figure 5 is a section taken on the line 5—5 of Figure 1.

Figure 6 is a perspective of the plate utilized for locking the ring gear of the differential positive to the shaft, and Figure 7 is a perspective view of the shifting member on the plate shown in Figure 6.

Figure 1:
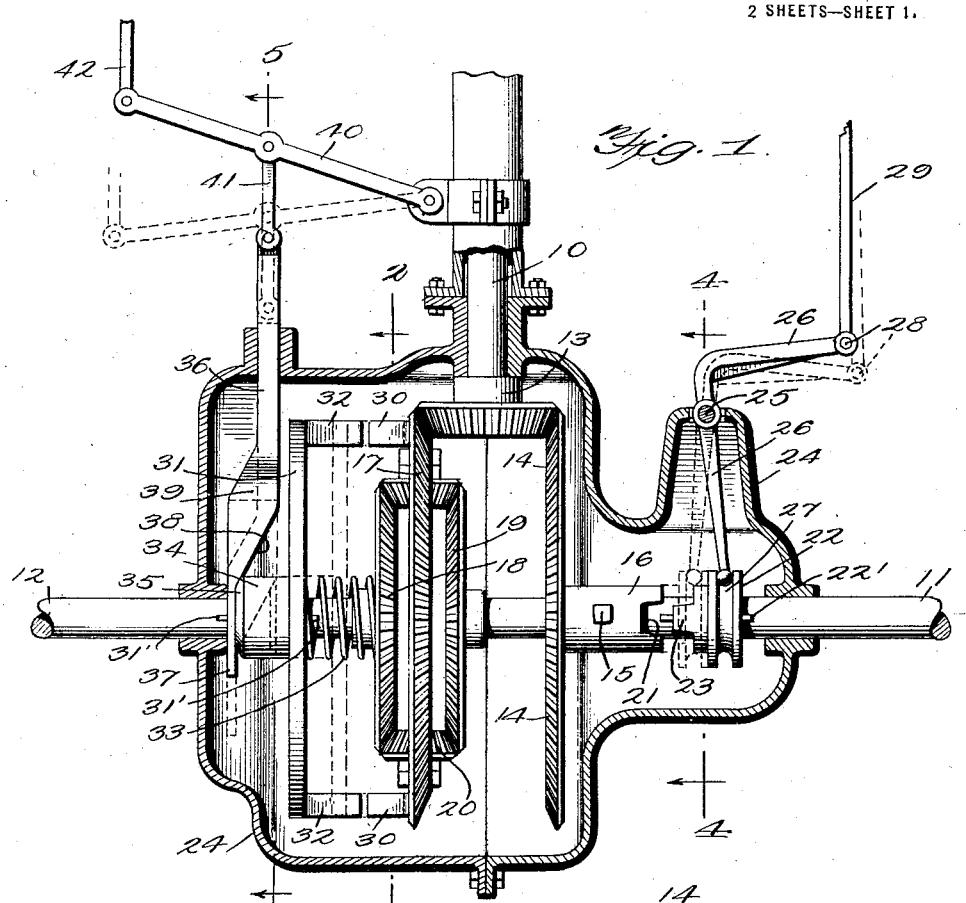
Figure 2:
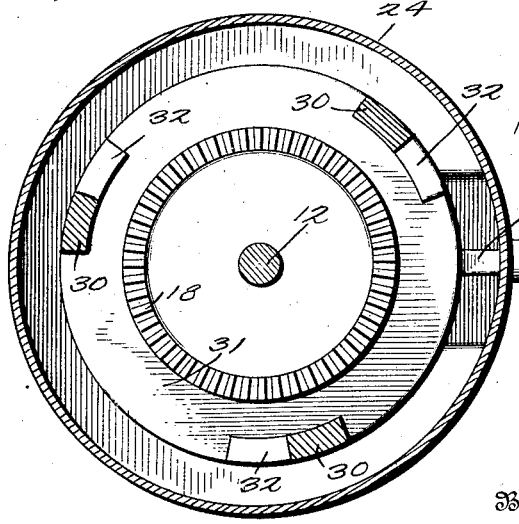
Figure 2 is a section taken on the line 2—2 of Figure 1.
Figure 3:
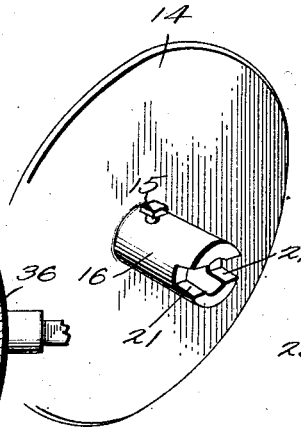
Figure 3 is a combined perspective of the idler gear of the differential and the member utilized for locking the idler gear positively to the shaft.

Referring now more particularly to the drawings, the numeral 10 indicates the drive or power shaft and the numerals 11 and 12 indicate the right hand and left hand driven shafts respectively. The drive shaft 10 is provided with the usual driving pinion 13.

Rotatably mounted upon the shaft 11 is an idler gear 14 which meshes with the pinion 13 and is held against shifting upon the shaft 11 by means of a set screw 15 extending through the hub 16 of the gear 14. This set screw operates in a suitable groove, (not shown) formed in the shaft 11.

Rotatably mounted upon the shaft 12 is the ring gear 17 of the differential which meshes with the pinion 13 of the drive shaft 10. Secured to the shaft 12 is a gear 18 and to the shaft 11 is a gear 19, these gears being arranged upon opposite sides of the ring gear 17, and meshing with pinions 20 rotatably carried by the ring gear 17, as is well known.

The hub 16 of the idler gear 14 is provided in its outer end with suitable notches 21. A member 22 is slidably mounted upon the shaft 11 but is prevented from rotation with relation thereto by means of keys 22'. This member is provided upon the face thereof adjacent the hub 16 with projections 23 adapted to enter the notches 21 of the hub 16.

The differential and its associated mechanisms are inclosed in a suitable casing 24, in which is pivotally mounted as at 25 a lever 26, one end of which engages in a groove 27, formed in the member 22. Pivotally connected at the other end of the lever 28 is a link 29 which is suitably connected with a suitably operated lever (not shown).

It will be seen that if the member 22 is shifted so that the projections 23 thereof engage in the notches 21 of the idler gear 14, the idler gear will be locked against rotation with relation to the shaft 11. As the gear 19 is secured to the shaft 11, this gear will be rotated through pinion 13, idler 14, and shaft 11 in one direction. The ring gear of the differential will be driven in the opposite direction and in consequence the gear 18 secured to the shaft 12 will be driven through medium of the pinions 20 in the same direction as the ring gear 17. It will thus be seen that the shafts 11 and 12 are rotated in opposite directions when the idler gear 14 is locked against rotation with relation to the shaft 11.

The ring gear 17 is provided upon its outer face with lugs 30. A member 31 is slidably mounted upon the shaft 12 but is held against rotation with relation thereto by means of keys 31'. The member 31 is provided upon its inner face with lugs 32 adapted to coact with the lugs 30 of the ring gear 17, but is normally held from engagement therewith by means of a spring 33 surrounding the shaft 12 and extending intermediate the member 31 and the gear 18 secured thereto.

The member 31 is provided with a hub 34 provided upon its outer end with a beveled face 35. A shifting member 36 is provided, bifurcated at its lower end to form spaced arms 37 which are disposed upon opposite sides of the shaft 12. These arms are provided with a beveled face 38 adapted to coact with the beveled faces 35 of the hub 34. By inspecting Figure 1, it will be seen that if the member 36 is shifted longitudinally the member 31 is caused to move inwardly so that the lugs 32 thereof engage the lugs 30 of the ring gear 17.

A lever 40 is suitably pivoted at one end and is connected intermediate its ends by a ring 41 with the forward end of the shifting member 36. The free end of the lever 40 is connected by means of a link 42 with a suitable operating lever (not shown). It will be seen that when the member 31 is shifted inwardly so that the lugs 32 thereof engage the lugs 30 of the ring gear, the ring gear is positively connected with the shaft 12 and the shaft will in consequence rotate at the same speed as the ring gear 17. As the gear 18 is secured to the shaft 12, this gear will also be rotated at the same speed as the ring gear 17 and the relative positions of the gears 17 and 18 will not change. It will therefore be obvious that the pinions 20 are stationary under these conditions and that the gear 19 will be rotated at the same speed as the gear, the shaft 11 in effect being positively connected with the shaft 12.

To those familiar with the art, it will be obvious that the construction, herein shown and described, is but one form whereby the application of my invention may be accomplished and that I accordingly do not limit myself to the specific structure herein described, but may make any such changes without departing from the spirit of the invention or the scope of the subjoined claims.

What I claim is:

1. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said idler gear to the shaft upon which it is mounted.

2. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said ring gear to the shaft upon which it is mounted.

3. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said ring and idler gears to the shafts upon which they are mounted.

4. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said idler gear to the shaft upon which it is mounted, comprising a hub for said idler gear provided in its outer end with notches, and a member slidably mounted on the shaft bearing said idler gear and held against rotation with relation thereto, said member being provided with projections adapted to enter the notches of said hub.

5. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts, a pinion secured to said power shaft and meshing with said ring gear and said idler gear, of means for locking said idler gear to the shaft upon which it is mounted, comprising a hub for said idler gear provided in its outer end with notches, a member slidably mounted on the shaft bearing said idler gear and held against rotation with relation thereto, said member being provided with projections adapted to enter the notches of said hub, and means for locking the ring gear of said differential to the shaft upon which it is mounted.

6. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts, a pinion secured to said power shaft and meshing with said ring gear and said idler gear, of means for locking said idler gear to the shaft upon which it is mounted, comprising a hub for said idler gear provided in its outer end with notches, and a member slidably mounted on the shaft bearing said idler gear and held against rotation with relation thereto, said member being provided with projections adapted to enter the notches of said hub, means for locking the ring gear of said differential to the shaft upon which it is mounted, comprising lugs formed upon the outer face of said ring gear, a member slidably mounted upon the shaft bearing the ring gear and held against rotation with relation thereto, lugs formed upon said member adapted to coact with the lugs formed upon said ring gear, and means for shifting said member to bring the lugs thereof into engagement with the lugs of said ring gear.

7. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said ring gear to the shaft upon which it is mounted, comprising lugs formed upon the outer face of said ring gear, a member slidably mounted upon the shaft bearing the ring gear and held against rotation with relation thereto, lugs formed upon said member adapted to coact with the lugs formed upon said ring gear, and means for shifting said member to bring the lugs thereof into engagement with the lugs of said ring gear.

8. The combination with a power drive shaft, a pair of driven shafts and differential gearing connecting said power and driven shafts embodying the usual ring gear rotatably mounted upon one of said driven shafts, an idler gear rotatably mounted upon the other of said driven shafts, a gear secured to each of said driven shafts, pinions rotatably connected with said ring gear and meshing with the gears secured to said driven shafts and a pinion secured to said power shaft and meshing with said ring gear and said idler gear, of means for locking said ring gear to the shaft upon which it is mounted, comprising lugs formed upon the outer face of said ring gear, a member slidably mounted upon the shaft bearing the ring gear and held against rotation with relation thereto, lugs formed upon said member adapted to coact with the lugs formed upon said ring gear, and means for shifting said member to bring the lugs thereof into engagement with the lugs of said ring gear, and means for locking said idler gear to the shaft upon which it is mounted.

9. In apparatus of the type described, a power shaft, a pinion mounted on said power shaft, a pair of driven shafts, differential gearing connected between said pinion and said driven shafts, and means connected between said pinion and one of said driven shafts for positively rotating said driven shafts in opposite directions.

In testimony whereof I affix my signature in presence of two witnesses.

PETER A. CUSTER.

Witnesses:
WINFIELD ZUCKER,
JAMES J. RAST.